United States Patent
Egan et al.

(10) Patent No.: US 7,817,036 B2
(45) Date of Patent: Oct. 19, 2010

(54) CABLED AND CABLELESS INTERFACE METHOD FOR CONNECTING UNITS WITHIN A RACK

(75) Inventors: Patrick K. Egan, Rochester, MN (US); Michael L. Miller, Rochester, MN (US); Todd J. Rosedahl, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 11/741,914

(22) Filed: Apr. 30, 2007

(65) Prior Publication Data

US 2008/0266090 A1    Oct. 30, 2008

(51) Int. Cl.
*G08B 13/12* (2006.01)

(52) U.S. Cl. ............... 340/568.2; 340/568.1; 340/539.1; 340/572.2; 340/572.7; 340/10.1; 340/825.49; 340/825.69; 709/203; 709/250; 709/253; 714/53

(58) Field of Classification Search ............... 340/568.2, 340/539.1, 572.1–572.9, 686.1, 10.1, 825.49, 340/825.69, 568.3, 5.61, 5.92, 10.3, 10.42, 340/10.5, 10.52, 825.66; 714/53; 709/250, 709/253, 203; 235/462.01; 398/142, 140, 398/141

See application file for complete search history.

(56) References Cited

U.S. PATENT DOCUMENTS

| 5,576,698 | A | 11/1996 | Card et al. |
| 5,790,782 | A * | 8/1998 | Martinez et al. ............... 714/53 |
| 6,523,070 | B1 * | 2/2003 | Stapleton et al. ............ 709/250 |
| 6,762,691 | B2 | 7/2004 | Piazza |
| 2002/0091463 | A1 | 7/2002 | Piazza |
| 2003/0046339 | A1 | 3/2003 | Ip |

* cited by examiner

*Primary Examiner*—George A Bugg
*Assistant Examiner*—Sisay Yacob
(74) *Attorney, Agent, or Firm*—Cantor Colburn, LLP

(57) ABSTRACT

A system and method for automatically determining a physical location of one or more units in a rack, including: using one or more physical cables between rack units; cascading a first signal through the one or more units located in the rack, the first signal being encoded with a unit number and a physical parameter; and creating a rack ID by utilizing hardware parameters, the hardware parameters being determined by: detecting a second signal that exists from a bottom unit, the bottom unit located at the bottom of the rack; and using a third signal to send data between the one or more units in the rack by manipulating void spaces within the rack, the third signal being either cabled or an optical signal.

13 Claims, 7 Drawing Sheets

Table 1

| Unit | Number of U | ID | location U | Location number | Rack ID |
|---|---|---|---|---|---|
| 10 | 6 | AB | 37 | 10 | A1 |
| 9 | 4 | AA | 33 | 9 | A1 |
| 8 | 5 | A9 | 28 | 8 | A1 |
| 7 | 3 | A7 | 25 | 7 | A1 |
| 6 | 4 | A6 | 21 | 6 | A1 |
| 5 | 5 | A5 | 16 | 5 | A1 |
| 4 | 4 | A4 | 12 | 4 | A1 |
| 3 | 3 | A3 | 9 | 3 | A1 |
| 2 | 4 | A2 | 5 | 2 | A1 |
| 1 | 4 | A1 | 1 | 1 | A1 |
|   | 42 |   |   |   |   |
| Data 1 | 4 | A1 | 1 | 1 | A1 |
| Send 1 |   |   | 5 | 1 | A1 |
| Data 2 | 4 | A2 | 5 | 2 | A1 |
| Send 2 |   |   | 9 | 2 | A1 |
| Data 3 | 3 | A3 | 9 | 3 | A1 |
| Send 3 |   |   | 12 | 3 | A1 |
| Data 4 | 4 | A4 | 12 | 4 | A1 |
| Send 4 |   |   | 16 | 4 | A1 |
| Data 5 | 5 | A5 | 16 | 5 | A1 |
| Send 5 |   |   | 21 | 5 | A1 |
| Data 6 | 4 | A6 | 21 | 6 | A1 |
| Send 6 |   |   | 25 | 6 | A1 |
| Data 7 | 3 | A7 | 25 | 7 | A1 |
| Send 7 |   |   | 28 | 7 | A1 |
| Data 8 | 5 | A9 | 28 | 8 | A1 |
| Send 8 |   |   | 33 | 8 | A1 |
| Data 9 | 4 | AA | 33 | 9 | A1 |
| Send 9 |   |   | 37 | 9 | A1 |
| Data 10 | 6 | AB | 37 | 10 | A1 |
| Send 10 |   |   | 43 | 10 | A1 |

Table 2
Data 1
Send 1      A1 / 1 1 A1 /
Data 2
Send 2      A1 / 1 1 A1 / 2 5 A2 /
Data 3
Send 3      A1 / 1 1 A1 / 2 5 A2 / 3 9 A3
Data 4
Send 4      A1 / 1 1 A1 / 2 5 A2 / 3 9 A3/4 12 A4
Data 5
Send 5      A1 / 1 1 A1 / 2 5 A2 / 3 9 A3/4 12 A4 / 5 16 A5
Data 6
Send 6      A1 / 1 1 A1 / 2 5 A2 / 3 9 A3/4 12 A4 / 5 16 A5 / 6 21 A6
Data 7
Send 7      A1 / 1 1 A1 / 2 5 A2 / 3 9 A3/4 12 A4 / 5 16 A5 / 6 21 A6 / 7 25 A7
Data 8
Send 8      A1 / 1 1 A1 / 2 5 A2 / 3 9 A3/4 12 A4 / 5 16 A5 / 6 21 A6 / 7 25 A7 / 8 28 A8
Data 9
Send 9      A1 / 1 1 A1 / 2 5 A2 / 3 9 A3/4 12 A4 / 5 16 A5 / 6 21 A6 / 7 25 A7 / 8 28 A8 / 9 33 A9
Data 10
Send 10     A1 / 1 1 A1 / 2 5 A2 / 3 9 A3/4 12 A4 / 5 16 A5 / 6 21 A6 / 7 25 A7 / 8 28 A8 / 9 33 A9 / 10 37 A/

US 7,817,036 B2

CABLED AND CABLELESS INTERFACE METHOD FOR CONNECTING UNITS WITHIN A RACK

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to connecting units within a rack, and particularly to a method for automatically determining the physical location of units in a rack and creating a rack ID.

2. Description of Background

There are several problems concerning existing approaches for determining unit locations within a rack. Known methods that have been used for location of Server and IT Equipment within a rack have been manual, e.g., entering the rack ID and location in the rack, entering the number wheels for rack location, and entering rack numbers or jumpers that assign a location number. A rack ID would be designated by a signal that would allow rack units to read a rack ID. However, this technique requires an external unit that contains a unique rack ID and does not address the location of units in a rack.

Considering the above limitations, it is desired to have a method for automatically determining the physical location of units in a rack and creating a rack ID.

SUMMARY OF THE INVENTION

The shortcomings of the prior art are overcome and additional advantages are provided through the provision of a system comprising: a rack having one or more units for automatically determining a physical location of the one or more units within the rack by implementing the steps of: using one or more physical cables between rack units; cascading a first signal through the one or more units located in the rack, the first signal being encoded with a unit number and a physical parameter; and creating a rack ID by utilizing hardware parameters, the hardware parameters being determined by: detecting a second signal that exists from a bottom unit, the bottom unit located at the bottom of the rack; and using a third signal to send data between the one or more units in the rack by manipulating void spaces within the rack, the third signal being either cabled or an optical signal.

The shortcomings of the prior art are overcome and additional advantages are provided through the provision of a method for automatically determining a physical location of one or more units in a rack, the method comprising: using one or more physical cables between rack units; cascading a first signal through the one or more units located in the rack, the first signal being encoded with a unit number and a physical parameter; and creating a rack ID by utilizing hardware parameters, the hardware parameters being determined by: detecting a second signal that exists from a bottom unit, the bottom unit located at the bottom of the rack; by manipulating void spaces within the rack, and using a third signal to send data between the one or more units in the rack, the third signal being either a cabled or an optical signal.

Additional features and advantages are realized through the techniques of the present invention. Other embodiments and aspects of the invention are described in detail herein and are considered a part of the claimed invention. For a better understanding of the invention with advantages and features, refer to the description and the drawings.

Technical Effects

As a result of the summarized invention, technically we have achieved a solution for a method for automatically determining the physical location of units in a rack and creating a rack ID.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

One aspect of the exemplary embodiments is a method for units in a rack to determine their location in the rack without using manual detecting techniques. Another aspect of the exemplary embodiments is utilizing system hardware parameters to create a unique rack ID. Another aspect of the exemplary embodiments is a method of determining a physical location in a rack by summing up the number of U's in a Daisy chain method. Another aspect of the exemplary embodiments is a method for cableless interface between units stacked in a rack using void spaces in the sides of racks, a method for cableless interface between units stacked in a rack using the void spaces in the sides of racks, and a method for cableless interface between units stacked in a rack using a fixed x-y location for using optical transmitters and receivers.

In the exemplary embodiments of the present invention, a rack ID is created by using information from a bottom unit (e.g., racks that are loaded from the bottom up). Each unit stores its unit height in "Us," and a cabling method where each box communicates to the box above it. The bottom unit sends a signal that it is box 1, and is "xUs high+1" and the unique rack ID that it has created to the box above it. The next unit adds one to the box number, so that box 2 knows that it starts at the "xUs" high location, and knows what box number it is. This box then sends it up to the next unit up and so on. Every unit then knows the U number that it is mounted in, the number unit it is in the rack and has a rack location. The exemplary embodiments are described with reference to the figures and describe the above-mentioned features.

Figure 1:
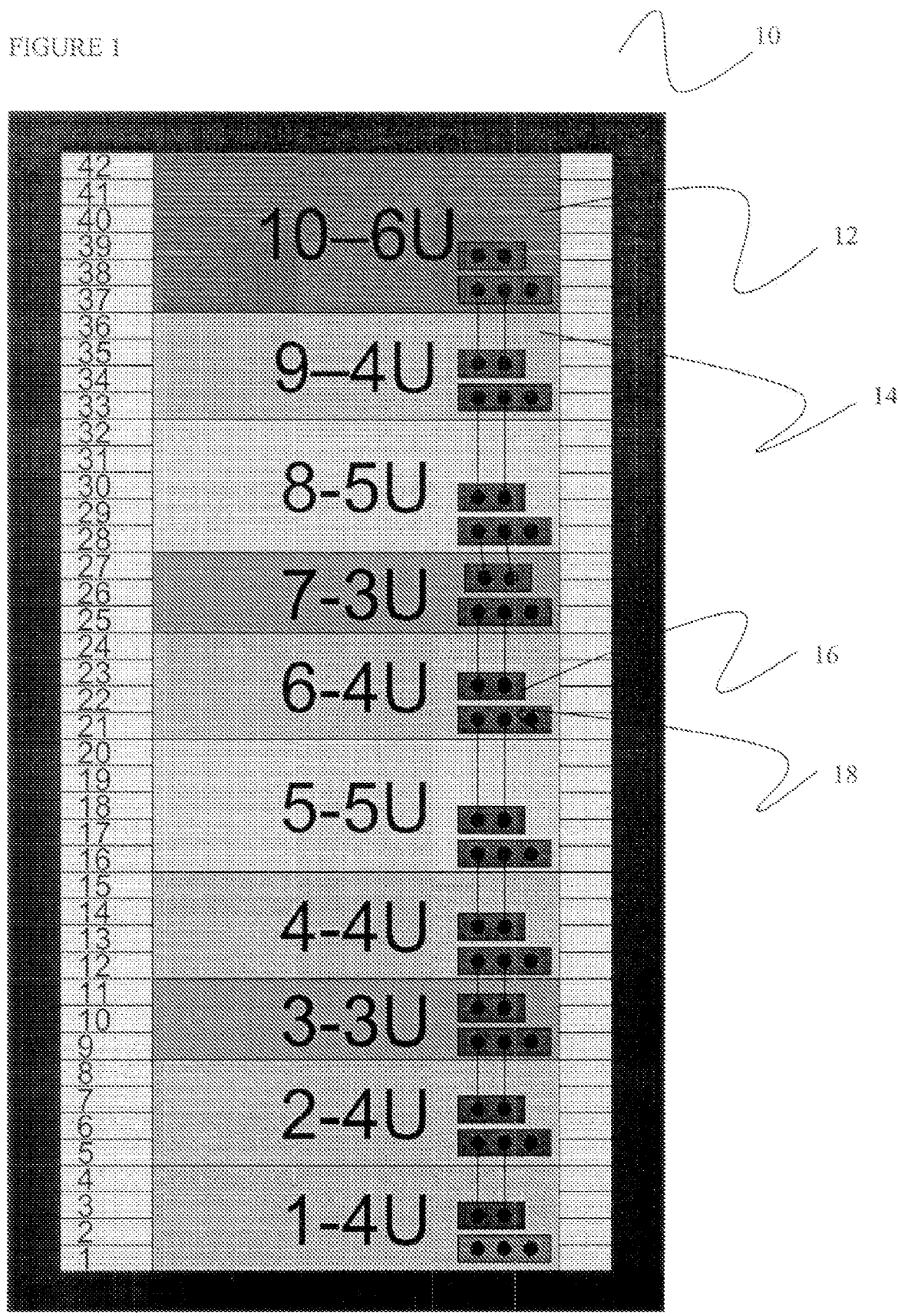
FIG. 1 is a schematic diagram of a 42U rack that is loaded with 10 units of different sizes, each unit including cabled inputs and outputs, in accordance with an embodiment of the invention.

Referring to FIG. 1, a schematic diagram of a 42-unit high (42U) rack 10 that is loaded with ten units of different sizes is illustrated. The 42U rack 10 of FIG. 1 includes at least a first unit 12 (10-6U) and a second unit 14 (9-4U). Each unit includes at least two connectors. For example, unit 6-4U includes a first connector 16 and a second connector 18.

Figure 2:
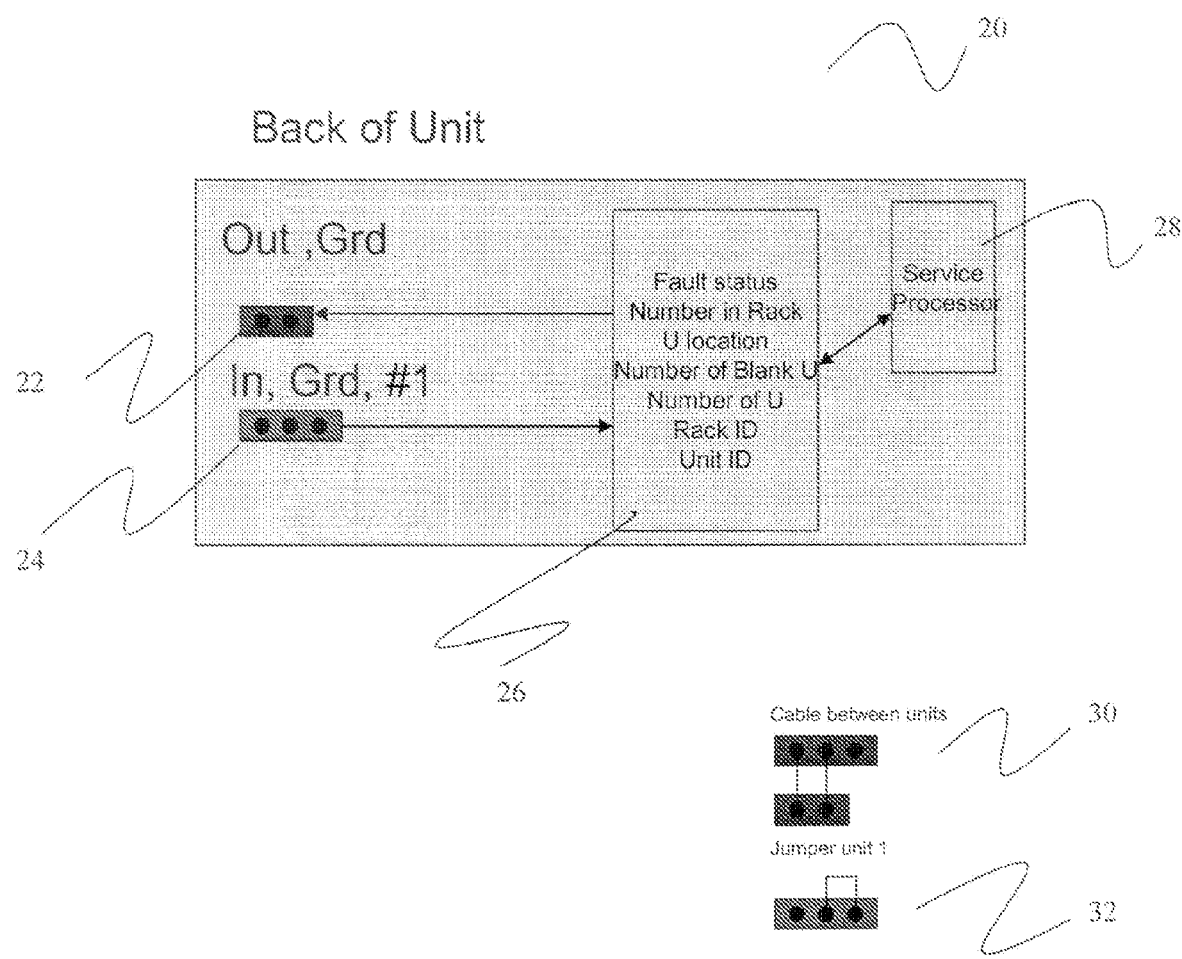
FIG. 2 is a back end of one unit of FIG. 1 depicting two connectors.

Referring to FIG. 2, a back end 20 of a unit depicting two connectors is illustrated. Each unit has two connectors as shown in FIG. 2: an "out" connector 22 and an "in" connector 24. There are 3 pins on the "in" connector 22, which include a ground pin, a serial in pin, and a pin to indicate location 1, which is used to distinguish the bottom unit and indicate that it is unit 1. The "out" connector 24 has a ground pin and a serial out pin. It will be noted that additional pins could be used if a 2 or 3 wire serial bus is used. Moreover, included inside each unit is an information processor 26 and a service processor 28. In addition, FIG. 2 illustrates cables used to connect between units. Cable 30 is a standard cable used between the units, whereas and cable 32 is only used in the first unit to instruct it that it is the unit in the bottom of the rack. However, the jumper in cable 32 is only required if a cable break function is desired. If cable 32 is not used, the unit with no serial inputs is the unit that becomes unit 1, the bottom unit in the rack.

The information processor 26 stores and sends the following information: Unit ID, Rack ID, Number of Us, Number of blank Us above, U location, Number location and Fault status. This information is defined as follows:

Unit ID: Unique ID for a unit, e.g., model number+serial number.

Rack ID: the Unique ID from Unit 1 used as rack ID.

Number of Us: the height of the Unit in Us.

Number of Blank Us: Field that can be loaded from an operating system to account for blank space in the rack, or units that don't support this interface.

U location: for first unit with this interface, if not 1, to deal with units with no interface below the first unit with this interface.

Unit number: of first unit with this interface, if not 1 to deal with units with no interface below the first unit with this interface.

U location: the location the unit starts at.

Number in the Rack: the unit number it is in the rack.

Fault status: fault status information being passed up.

This method is not limited to only this type of information. The information is presented for illustrative purposes. One skilled in the art may use several different parameters and different values to achieve similar results.

Figure 3:
FIG. 3 is a table illustrating the information contained in an information processor.

Referring to FIG. 3, a table 40 has been constructed to illustrate the information contained in the information processor 26 of FIG. 2. The table shows a simple ID A1 through AB, instead of the "model number+serial number" that would be used in a real application. The first unit has the cable 32 from FIG. 2 plugged into the "in" connector. This instructs the unit that it is the bottom unit, with the "number 1" pin grounded. Therefore, the bottom unit reads (from an onboard processor or from a Virtual Private Database (VPD) module) its own unique ID (A1) and its own height (in Us). Also, the bottom unit stores in a storage unit that it is "Unit 1" and that it is in U location "1." Note that if the drawer is the bottom drawer, but is not in U location "1," this is overridden by the operating system. If no operating system U value has been received by the unit, it defaults to U location "1."

Unit 1 then Sends the following information, Rack Number A1, Unit number 1, and U location 5 (location 1U+4U). Unit 2 receives this information, and writes the following information to its own onboard processor or its own VPD module: the Rack ID of A1, Unit number 2 (Unit data 1+1) and U location of 5. Unit 2 then sends to the next unit up in the rack, the rack ID of A1, Unit number 2, and U location of 9 (5+4) and so on up the rack. The data is then sent out at a fixed amount of time, to make sure that any new hardware that is added is detected. The service processor 28 or other communication path to the operating system can now read the data that is stored in each unit, where physical location with in a rack and a rack ID can be read.

The field call "Blank Us" is used in the case a blank "Us" is in the middle of the rack between units. A system manager function could download the blank number of Us to the unit under the blanks, thus assuring the rest of the units have the correct U location. These fields (i.e., U location and Unit number) are used by the first unit, so that if there are units below this unit, they can be accounted for by having the system load these fields to account for units that do not support this interface. Therefore, if the first unit that uses this interface is at U5, and there are two 2 Units below it without this interface, the number 3 is loaded at the unit number, and 5U is loaded as the start point. Also if a unit, other then Unit 1, does not receive data after a specified timeout, it does not change its stored data and continues to send the old data to the next box, along with status of a cable break. All units above the break realize the cable break, and the first unit after the cable break reports it to the system so that the cable break location is known. Cable break detection is enabled by using cable 32 as shown in FIG. 2.

If there is a cable break at first power up, other methods may be used. Nevertheless, the cable break location is known, i.e., at a unit, but the physical to logical location is not determined at that time. The units after the break could do one of 3 things for rack ID: (1) Use it's Unit ID as the Rack ID, (2) Send the Unit ID of the first unit after the break as the rack ID to the units above, (3) Send blank Rack ID so that it is know that the units location has not been mapped to a rack. However, once rack ID has been associated with the Unit, a cable break should not be allowed to change the rack ID that is stored, until the cable link is restored, and then the rack ID can be change if required (i.e., in a new rack or replacement of the bottom unit). When the cable is broken to add a new unit to the rack, the units above the break do not change the data and rack ID remains the same, as well as "number location" and "U location." When the new units are placed back in the string, at this point new data begins to flow, and the data is updated. Each unit sees new data and knows if it has been moved in a rack, to a new rack or new hardware has been added.

An exemplary data string may include: (<Rack ID> <Location number> <U location><Fault data, fault and indicate>). The information that is now stored in each unit can be associated with that unit, so that if the system has a logical link to the unit, bus address, Small Computer System Interface (SCSI) bus address, or other. This can now be associated with the physical location. Thus, a physical to logical association is now known. This data can now be used from the management system to create a system visualization where a drawing of multiple rack systems can be created that shows both physical and logical locations.

There are some additional features that could be added to these exemplary embodiments. One of these features is a rack indicator. Each unit could also send in the serial string "Fault" and "Indicate" information in the serial string. This information would read and be passed through each unit. A Rack Indicator could be placed on the top of the rack that would read this fault status (combination of all units in the rack) and Light up a Light Emitting Diode (LED) with the correct status. It could also display the rack ID, if this feature was desired.

Figure 4:
FIG. 4 is a table illustrating string data.

Another feature is related to string data. Referring to FIG. 4, a table 42 has been constructed to illustrate the string data. String data could be sent up the rack. Where all data is sent upward through the rack, Unit 1 sends it is Rack A1, Unit 1 in rack location 1, and an unit ID of A1, unit two adds unit 2, in location 5 with ID of A2 and so on. This way, the top unit in the system has complete information of all units in the rack.

Another feature is related to a loop method. This could be realized with a total closed loop where the top unit wires back to the input of unit 1. Unit 1 still has the grounded pin to instruct it that it is Unit 1. The string data would continue around the loop, until Unit 1 sees its own data, and then would send the same string upward. The data would remain the same until a new unit was added where the units could detect the difference. The string in the loop is called the hardware string. An exemplary data string of this type may include: (<Rack ID> <Location number> <U location> <Fault data, fault and indicate> <Hardware string>).

Another exemplary embodiment concerns an optical cable free method. This involves a way that units in a rack can send information to each other without the use of cables. In particular this concept works well with the concepts disclosed above related to rack location designs. This allows this information to flow without the use of physical cables. Furthermore, in this exemplary embodiment, an optical interconnect between units is created using the void spaces in the sides of the rack. This could also be realized in a fixed x-y location on the rack unit.

Figure 5:
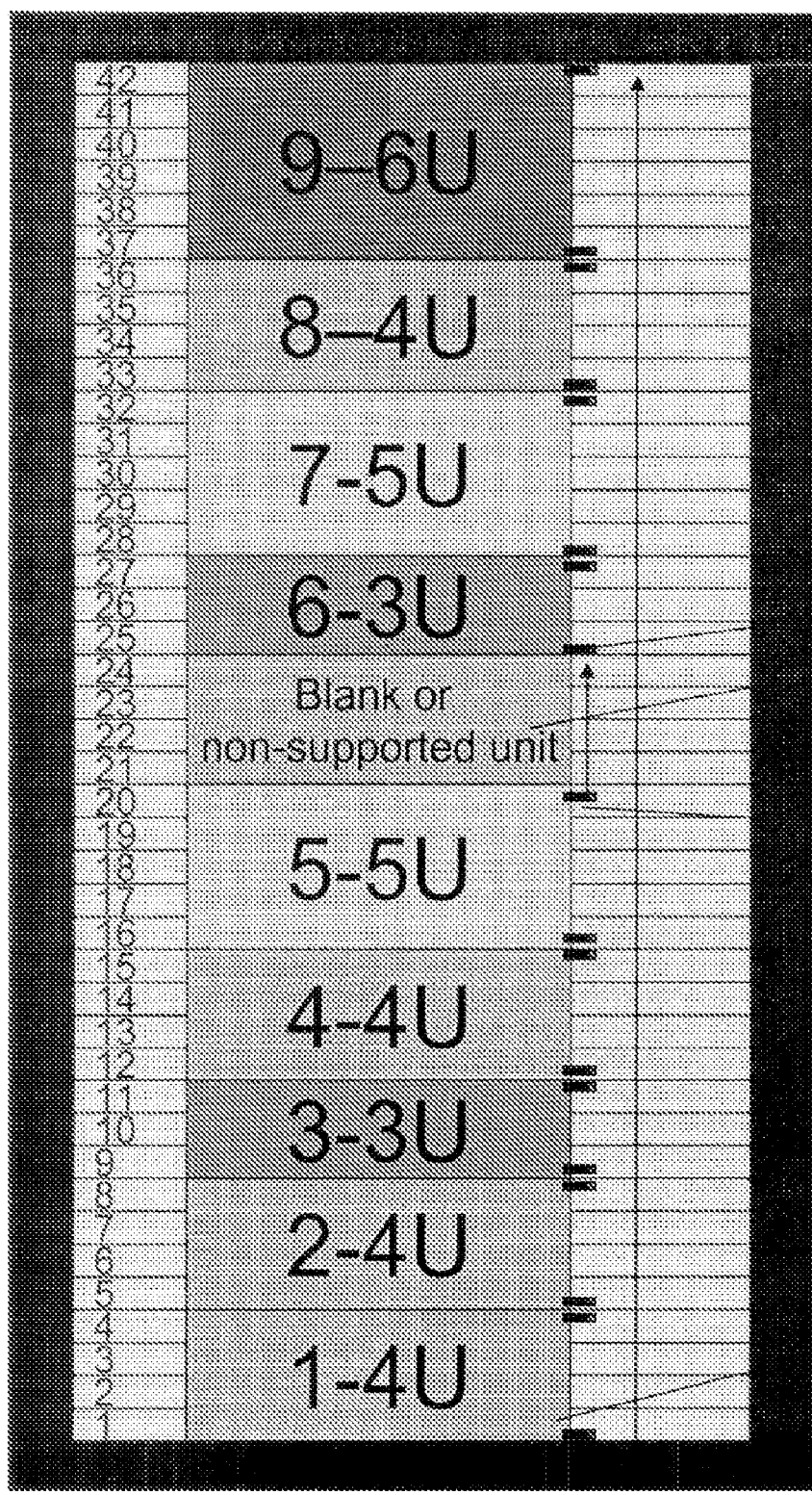
FIG. 5 is a schematic diagram of a 42U rack that is loaded with 10 units of different sizes, each unit including optical inputs and outputs, in accordance with an embodiment of the invention.

Referring to FIG. 5, a schematic diagram of a rack having a plurality of optical links communicating with each other is illustrated. The 42U rack 50 of FIG. 5 includes at least a first unit 52 (1-4U) and a blank (or non-supported) unit 54. Each unit of the rack 50 includes a receiver 56 and a transmitter 58. Therefore, the rack 50 has a communication path between the units in the rack 50.

The type of information that may be used in this type of communication network could be the rack location information as disclosed above, where the following information is passed from unit to unit.

Unit ID: Unique ID for a unit, e.g., model number+serial number.

Rack ID: the Unique ID from Unit 1 used as Rack ID.

Number of Us: the height of the Unit in Us.

Number of Blank Us: U location for first unit with this interface.

Unit number: of first unit with this interface.

U location: the location the unit starts at.

Number in the Rack: the unit number it is in the Rack.

Fault status: a fault status information being pass up.

This method is not limited to only this type of information. The information is presented for illustrative purposes. One skilled in the art may use several different parameters and different values to achieve similar results.

Figure 6:
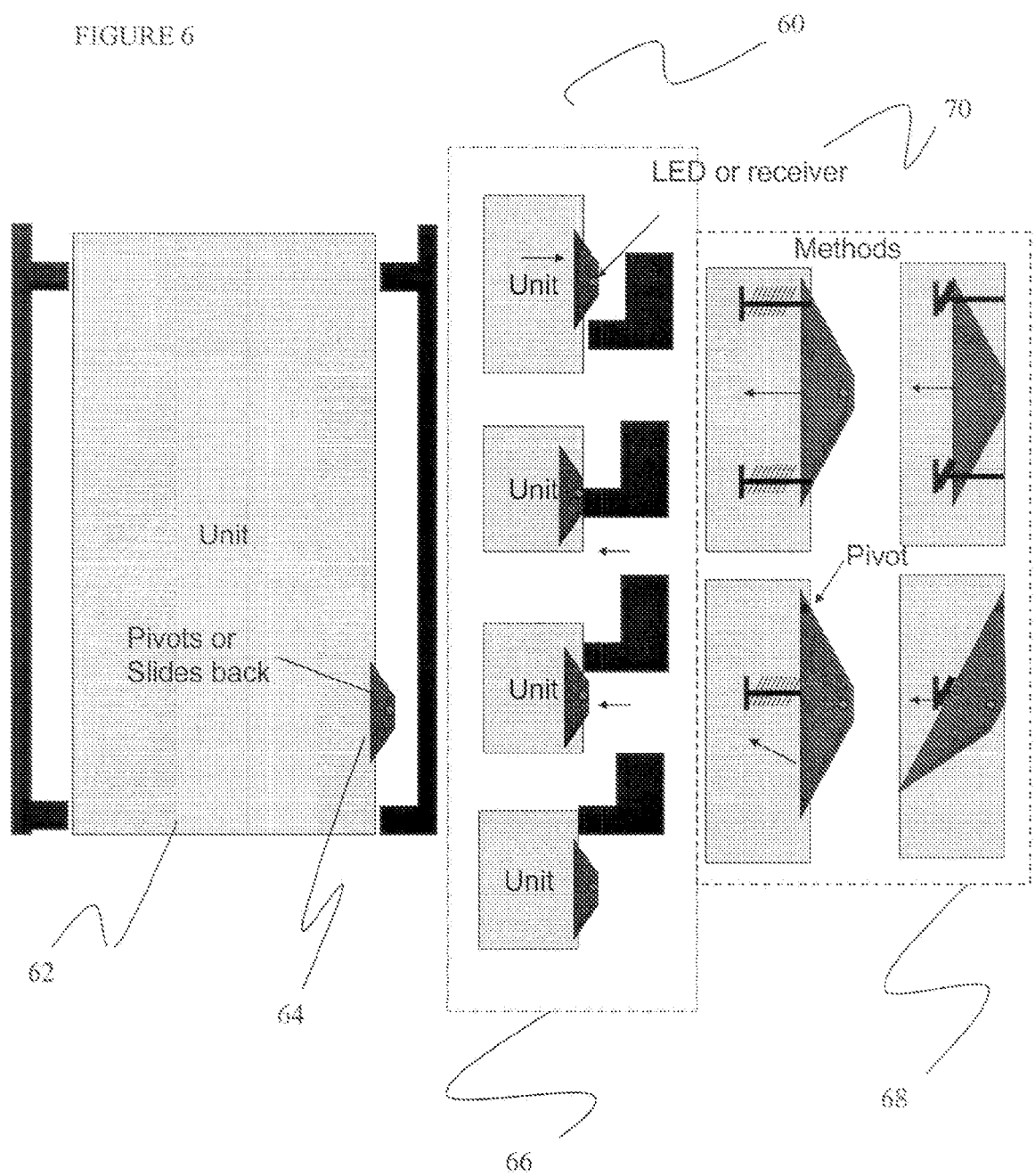
FIG. 6 is a schematic diagram of how the optical links in FIG. 5 use void spaces in the sides of the rack, in accordance with an embodiment of the invention.

Referring to FIG. 6, a schematic diagram of how the optical links in FIG. 5 use void spaces in the sides of the rack is illustrated. The system 60 includes a main unit 62, a pivot 64, a series of units 66, and a method of attaching the units 68. Each unit includes an LED or receiver 70.

The main concern is that a standard rack is 19" wide and that is all that fits between the mounting strips at the front and back of the rack. But in between these mounts is void space. So the optical transmitters and receivers are placed on an arm that moves out of the way and springs back into its fixed location.

The methods of FIG. 6 involve: When a user places the unit into the rack, the optical mount is pushed backwards into the unit, so that the unit can clear the mounting brackets. After the bracket has been cleared the optional mount then moves back into its fixed location. The optical mount is in the same physical location in each unit so that the optical transmitters and receivers align. The transmitters would tend to have a wide angle to make up for tolerances in alignment. The optical arms would also be designed to block the light from the transmitter from leaking upward. Also the transmitter and receiver would, be able to span a space to allow for blank spaces 54 in FIG. 5 or units that do not support this interface.

Figure 7:
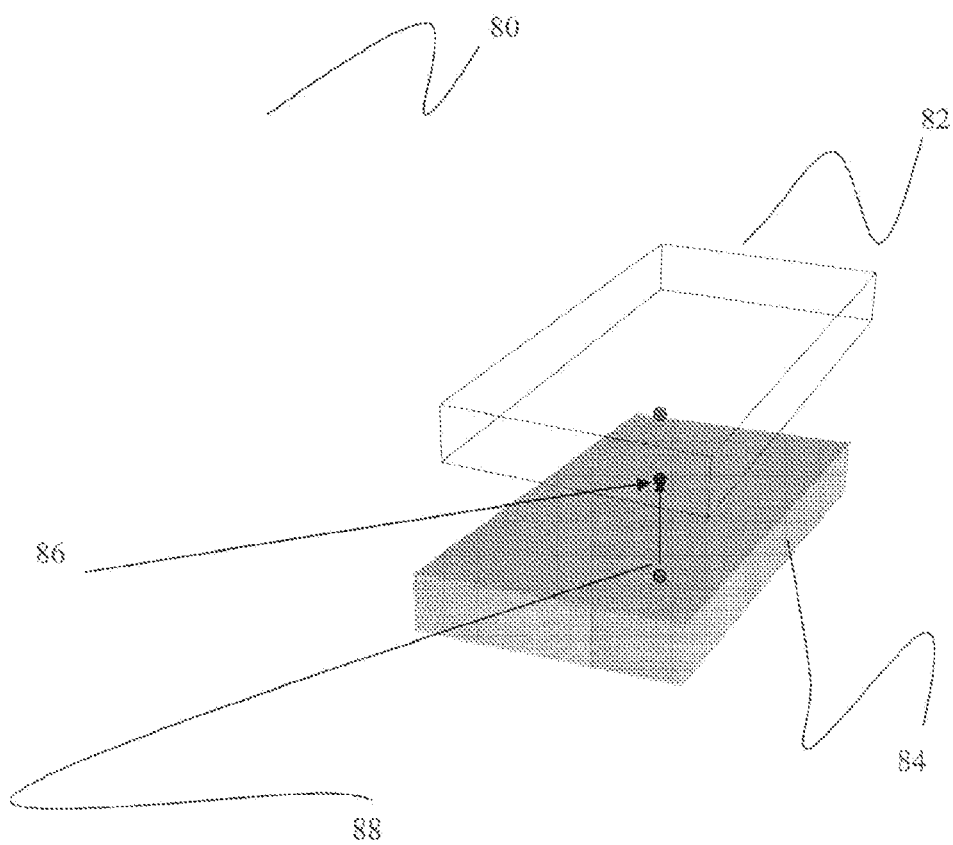
FIG. 7 is a schematic diagram of another method of producing an optical link at a fixed x-y location in a unit, in accordance with an embodiment of the invention.

Referring to FIG. 7, a schematic diagram of another method of producing an optical link at a fixed x-y location in a unit is illustrated. The system 80 includes a top unit 82, a bottom unit 84, a receiver 86, and a transmitter 88. The communication of data flows from the bottom unit 84 to the top unit 82 of the rack.

Figure 8:
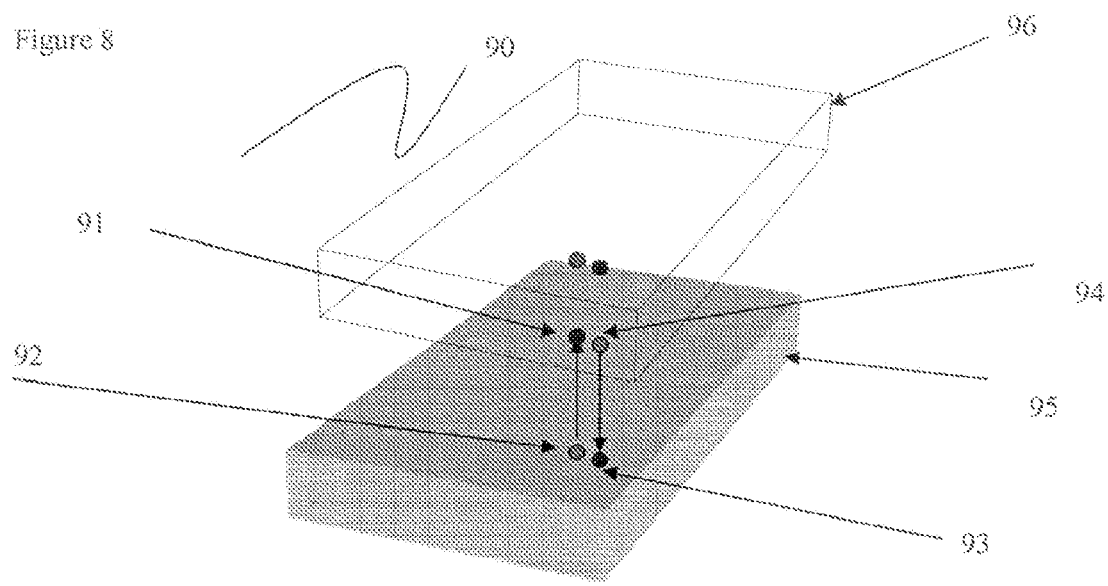
FIG. 8 is a schematic diagram of where each rack unit or optical arm could have both a transmitter and a receiver on the top of the unit, in accordance with an embodiment of the invention.

Referring to FIG. 8, a schematic diagram where each rack and or optical arm could have both a transmitter 92 and a receiver 93 on the top of the unit, and both a transmitter 94 and a receiver 91 on the bottom of the unit, so that communications could flow both ways (up and down the rack), to support the loop method.

Referring to FIG. 8 the transmitter 92 and 94 and receiver 91 and 93 pairs, can be used to determine the number of "Us" between the units. This is done by measuring the time for a signal to be sent between one unit and back to the other.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform tire capabilities of the present invention can be provided.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for automatically determining a physical location of one or more units in a rack, the method comprising:
using one or more physical cables between rack units;
cascading a first signal through the one or more units located in the rack encoded with at least one unit number parameter and at least unit height parameter; and
creating a rack ID by utilizing hardware parameters, the hardware parameters being determined by:
detecting a second signal passed from a bottom unit, the bottom unit located at the bottom of the rack; and using a third signal to send data between the one or more units in the rack by manipulating void spaces within the sides of the rack, the third signal being either cabled or an optical signal.

2. The method of claim 1, wherein each of the one or more units includes an optical transmitter and a receiver.

3. The method of claim 1, wherein the data includes: a Unit ID, the rack ID, a number of units, a number of blank units, a unit location, the unit number, and a fault status of each of the one or more units.

4. The method of claim 1, wherein the one or more units include arms that use voids in the side of the racks for optical communication.

5. The method of claim 1, wherein the one or more units are located at fixed locations for optical communication.

6. A system comprising:
a rack having one or more units for automatically determining a physical location of the one or more units within the rack by implementing the steps of:
using one or more physical cables between rack units;
cascading a first signal through the one or more units located in the rack encoded with at least one unit number parameter and at least unit height parameter; and creating a rack ID by utilizing hardware parameters, the hardware parameters being determined by:
detecting a second signal passed from a bottom unit, the bottom unit located at the bottom of the rack;
by manipulating void spaces within the rack; and
using a third signal to send data between the one or more units in the rack by manipulating void spaces within the sides of the rack, the third signal being either cabled or an optical signal.

7. The system of claim 6, wherein each of the one or more units includes an optical transmitter and a receiver.

8. The system of claim 6, wherein the data includes: a Unit ID, the rack ID, a number of units, a number of blank units, a unit location, the unit number, and a fault status of each of the one or more units.

9. The system of claim 6, wherein an interconnect between the rack units is optical.

10. The system of claim 6, wherein the optical transmitter and the receiver are used to determine a number of blank units or a number of non-supporting units between the one or more units located in the rack.

11. The system of claim 6, wherein the one or more units include arms that use voids in the side of the racks for optical communication.

12. The system of claim 6, wherein the one or more units are located at fixed locations for optical communication.

13. A method for optically connecting one or more units within a rack, the method comprising:
cascading a first signal through the one or more units located in the rack encoded with at least one unit number parameter and at least unit height parameter; and
creating a rack ID by utilizing hardware parameters, the hardware parameters being determined by:
detecting a second signal passed from a bottom unit, the bottom unit located at the bottom of the rack; and
using a third signal to send data between the one or more units in the rack by manipulating void spaces within the rack, the third signal being either cabled or an optical signal;
wherein the one or more units include arms that use the void spaces in the side of one or more racks for optical communication or
wherein the one or more units are located at fixed locations for optical communication.

* * * * *